United States Patent [19]

Boudaud

[11] Patent Number: 6,137,665

[45] Date of Patent: *Oct. 24, 2000

[54] SELECTIVE ELECTRONIC TRIP UNIT, A CIRCUIT BREAKER COMPRISING SUCH A TRIP UNIT AND A SELECTIVE TRIPPING PROCESS

[75] Inventor: Dominique Boudaud, Seyssins, France

[73] Assignee: Schneider Electric SA, France

[*] Notice: This patent issued on a continued prosecution application filed under 37 CFR 1.53(d), and is subject to the twenty year patent term provisions of 35 U.S.C. 154(a)(2).

[21] Appl. No.: 09/049,134

[22] Filed: Mar. 27, 1998

[30] Foreign Application Priority Data

Apr. 15, 1997 [FR] France .................... 97 04915

[51] Int. Cl.[7] .................................................. H02H 3/00
[52] U.S. Cl. ................................................... 361/63
[58] Field of Search ................... 361/61–75, 78–81, 361/93–97, 102, 93.1

[56] References Cited

U.S. PATENT DOCUMENTS 4,644,438  2/1987  Puccinelli et al. .................. 361/75

4,733,321  3/1988  Lindeperg ........................... 361/96

FOREIGN PATENT DOCUMENTS 0350824  1/1990  European Pat. Off. ....... H01H 71/10
2160459  6/1973  France .......................... H02H 7/00

*Primary Examiner*—Ronald W. Leja
*Attorney, Agent, or Firm*—Parkhurst & Wendel, L.L.P.

[57] ABSTRACT

A selective electronic trip unit comprises at least one current sensor supplying a secondary signal representative of a primary current, a first detection circuit to detect a first overshoot of a first threshold, and a second detection circuit to detect signals representative of contact repulses interrupting the primary current, said first and second detection circuits receiving the secondary signal. An analysis circuit connected to the second detection circuit disables instantaneous tripping of the trip unit if the signals representative of repulses are representative of currents lower than a second threshold.

Application, in particular to selective circuit breakers.

16 Claims, 9 Drawing Sheets

SELECTIVE ELECTRONIC TRIP UNIT, A CIRCUIT BREAKER COMPRISING SUCH A TRIP UNIT AND A SELECTIVE TRIPPING PROCESS

BACKGROUND OF THE INVENTION

The invention relates to a selective electronic trip unit comprising:

- at least one current sensor supplying signals representative of primary currents,
- a processing unit comprising means for selective instantaneous tripping connected to the current sensor and supplying a tripping order according to signals supplied by said sensor.

Known electronic trip units generally comprise processing units to perform the thermal or long delay tripping, magnetic or short delay tripping, and instantaneous tripping protections. To achieve selectivity between two circuit breakers connected in series or cascade, it is known to have a high rating in an upline circuit breaker and a low rating in a downline circuit breaker. In this case the instantaneous tripping selectivity is current-based. The instantaneous tripping threshold of the downline circuit breaker is lower than that of the upline circuit breaker.

It is also possible to use a time-based selectivity between two circuit breakers. In this case the trip unit of the upline circuit breaker has a greater instantaneous tripping time delay than the tripping time of the downline circuit breaker trip unit.

These two types of selectivity are not very efficient when short-circuit currents are very high as current thresholds are exceeded in both the circuit breakers and too long a time delay of the trip unit is liable to result in premature wear of the upline circuit breaker contacts. To avoid these drawbacks, selective trip units comprise devices to count beats or opening-closing cycles of the contacts on a short-circuit fault. A trip unit of this kind is notably described in European Patent Application EP-0,128,084.

However, state-of-the-art selective trip units must be used in voluminous and bulky limiting circuit breakers able to withstand a high number of opening-closing cycles and therefore able to guarantee efficient selectivity with respect to the circuit breakers connected downline.

The use of such selective trip units in normal circuit breakers of small dimensions is liable to reduce the endurance of said circuit breakers. This shortcoming is essentially due to the beat counting time which may be several AC current cycles.

SUMMARY OF THE INVENTION

The object of the invention is to achieve a selective trip unit having a very high selectivity, a very fast response time, and enabling the endurance of the circuit breakers to be increased.

In a trip unit according to the invention, the means for selective instantaneous tripping comprise:

- first means for detecting an operating range connected to the current sensor,
- second means for detecting repulses producing primary current interruptions between two half-waves of primary alternating current, and
- means for analysis, connected to the first and second means for detection, to disable supply of a tripping order if repulses are for primary currents lower than a preset threshold.

According to a preferred embodiment of the invention, the means for analysis disable a tripping order if repulses are detected during a preset analysis period.

Preferably, the first means for detection comprise first means for comparison to compare the signals supplied by said current sensor to a first preset threshold and the means for determining the start of the analysis period.

Advantageously, the second means for detection comprise means for detecting signals representative of the derivative of the primary current.

In a particular embodiment of the invention, the current sensors are magnetic circuit current transformers supplying a secondary current comprising peaks representative of repulses, the signals representative of primary currents corresponding to said secondary current.

Preferably, the second means for detecting repulses comprise means for detecting signal peaks supplied by the sensors to detect said peaks during the preset analysis period.

Advantageously, the means for determining the start of the preset analysis period comprise means for detecting when signals supplied by the sensors drop to zero or close to zero.

According to a development of a particular embodiment, the second means for detecting repulses comprise means for storing the presence and value of a signal peak supplied by the sensors.

The means for analysis comprise second means for comparison connected to the means for detecting signal peaks to compare the value of the peaks to a second preset threshold.

Preferably, the means for comparison compare the value of the signal peaks supplied by the sensors to the second preset threshold after the preset analysis period.

For example, the means for analysis disable an instantaneous tripping order if the peaks detected are lower than the second preset threshold.

Advantageously, the preset analysis period is less than ten milliseconds.

A circuit breaker according to the invention comprises main contacts in which primary currents flow, a mechanism for opening said contacts commanded by a tripping order, and a trip unit according to one of the above embodiments supplying a tripping order to said opening mechanism.

A first selective tripping process according to the invention comprises:

- a step for measuring a signal representative of a primary current flowing in an electrical conductor to be protected,
- a step for comparing the measured signal to a first preset threshold,
- a step for determining the start of repulse observation,
- a detection phase of predetermined duration to detect the occurrence of signals representative of repulses among the measured signals, and
- an analysis step to disable instantaneous tripping if signals representative of repulses occur for primary currents lower than a second preset threshold.

A second selective tripping process according to the invention comprises:

- a step for measuring a signal representative of a primary current supplied by a current sensor,
- a step for comparing said measured signal to a first preset threshold,
- a step for detecting when the measured signal drops to zero or close to zero,
- a detection phase of predetermined duration to detect peaks in said measured signal, and an analysis step to disable instantaneous tripping if the detected peaks are lower than a second preset threshold.

According to a first alternative embodiment of the second process, the detection phase comprises a step of comparing the detected peaks to give a tripping order before the end of the detection phase if a detected peak is greater than a third preset threshold.

According to a second alternative embodiment of the second process, the detection phase comprises a step of comparing said measured signal to a third preset threshold to give a tripping order before the end of the detection phase if a peak is not detected and if said measured signal becomes greater than a fourth preset threshold.

BRIEF DESCRIPTION OF THE DRAWINGS

Other advantages and features will become more clearly apparent from the following description of particular embodiments of the invention given as non-restrictive examples only and represented in the accompanying drawings in which.

DETAILED DESCRIPTION OF THE PREFERRED EMBODIMENT

Figure 1:
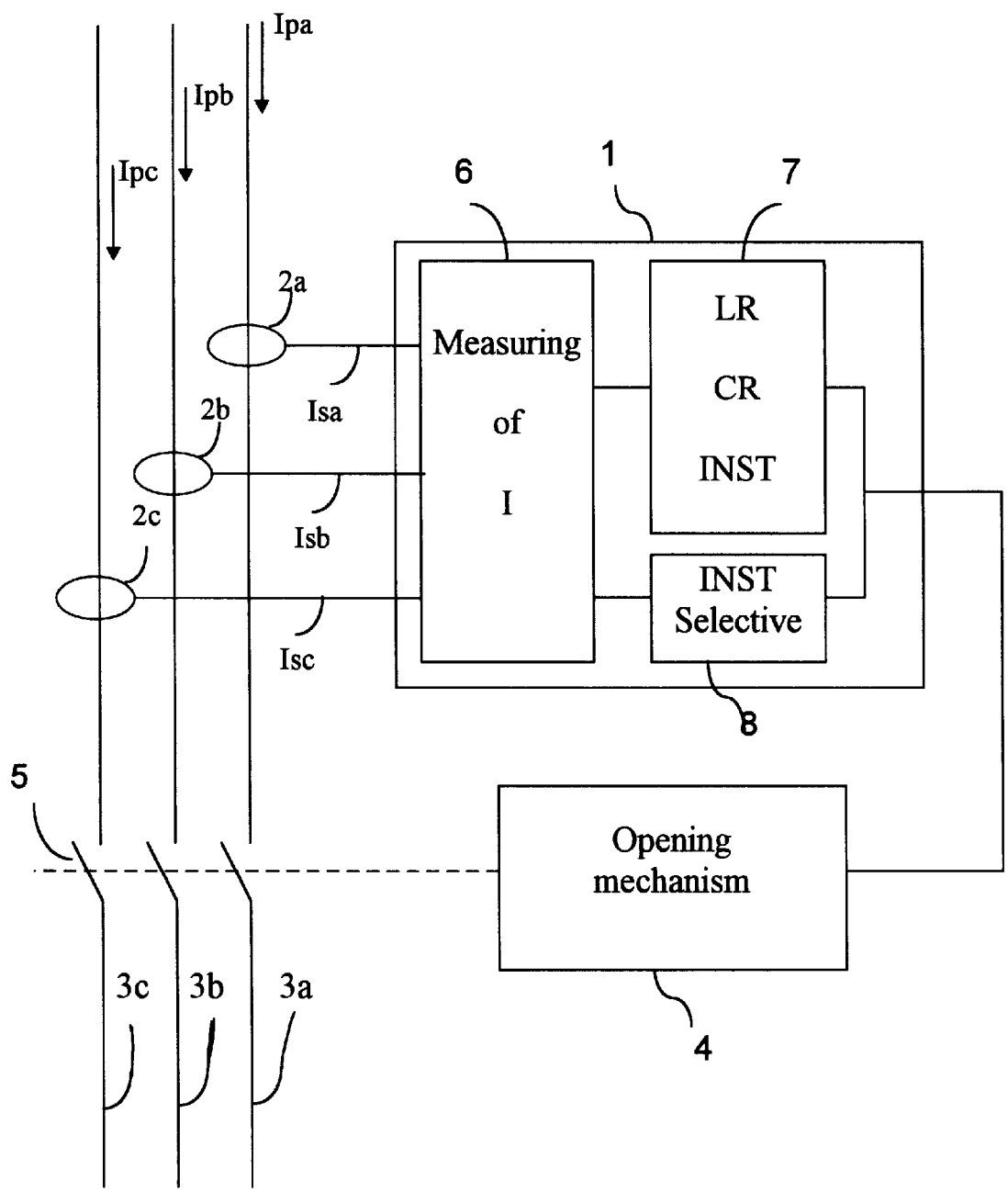
FIG. 1 represents the block diagram of a circuit breaker comprising a trip unit of known type.

In a known circuit breaker such as the one represented in FIG. 1, an electronic trip unit comprises a processing unit 1 connected to current sensors 2a, 2b, 2c supplying signals Isa, Isb and Isc representative of primary currents Ipa, Ipb and Ipc flowing in the main conductors 3a, 3b and 3c. The processing unit supplies a tripping order to an opening mechanism 4 to open main contacts 5 in order to interrupt the primary currents in the main conductors.

Generally, the processing unit 1 comprises a current measuring circuit 6 receiving the signals Isa, Isb and Isc representative of the primary currents, and an electronic circuit 7 to perform the tripping functions, connected to said measuring circuit and to the mechanism 4. In known manner, these tripping functions are thermal or long delay protection, magnetic or short delay protection, or instantaneous tripping functions. The circuit 7 supplies a tripping order when currents exceed thresholds during preset times.

In trip units designed to provide a high degree of selectivity, the processing unit comprises a selective tripping circuit 8 connected to the measuring circuit 6 and supplying or disabling a tripping order according to the signals representative of primary currents which it receives.

Known tripping circuits count the number of pulses or beats due to opening-closing of the contacts 5. These circuits 8 are specially designed for limiting circuit breakers of large dimensions.

Figure 2:
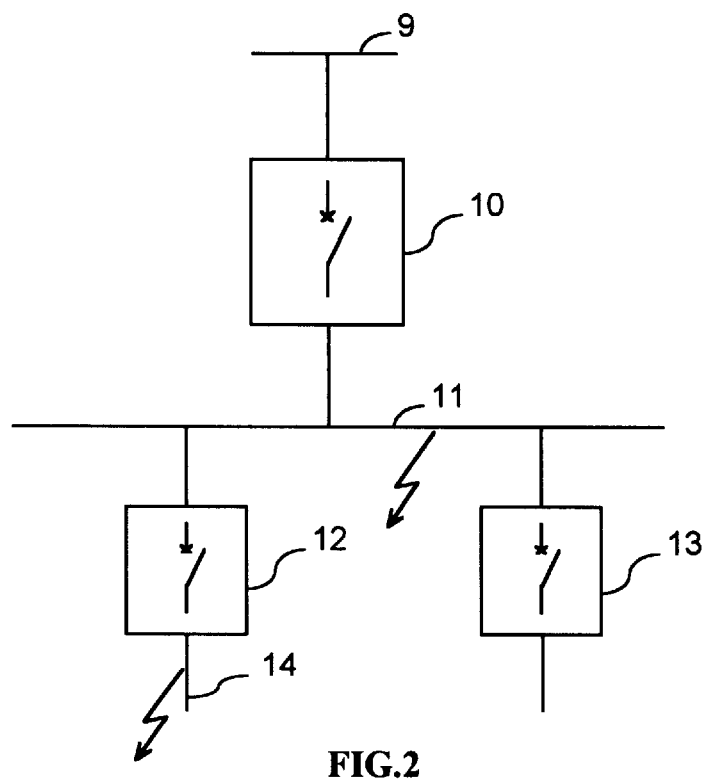
FIG. 2 represents a block diagram of an electrical installation comprising circuit breakers able to have selective trip units.

FIG. 2 shows an installation comprising circuit breakers arranged in cascade and having to have a selective function. A first upline circuit breaker 10, comprising a selective tripping circuit 8, is connected to a main line 9 and supplies a secondary line 11 connected to two downline circuit breakers 12 and 13.

If an electrical short-circuit occurs on a line 14 supplied by a downline circuit breaker for example the circuit breaker 12, the circuit breaker 10 detects the fault but must not trip immediately. In this case, the downline circuit breaker 12, which also detects the fault, trips and clears the short-circuit current. The upline circuit breaker 10 no longer detects a fault, does not trip and continues to supply other circuit breakers or equipment, in particular the circuit breaker 13.

A short-circuit occurring on the line 11, supplied directly by the upline circuit breaker 10, is only detected by said circuit breaker 10. In this case, a known instantaneous trip device counts the beats or performs a tripping time delay to achieve selectivity.

In a trip unit according to an embodiment of the invention, the instantaneous trip device can quickly differentiate the short-circuit faults occurring on lines 11 supplied directly by the circuit breaker 10 or on lines 14 supplied by at least two circuit breakers 10 and 12 connected in series.

Figure 3:
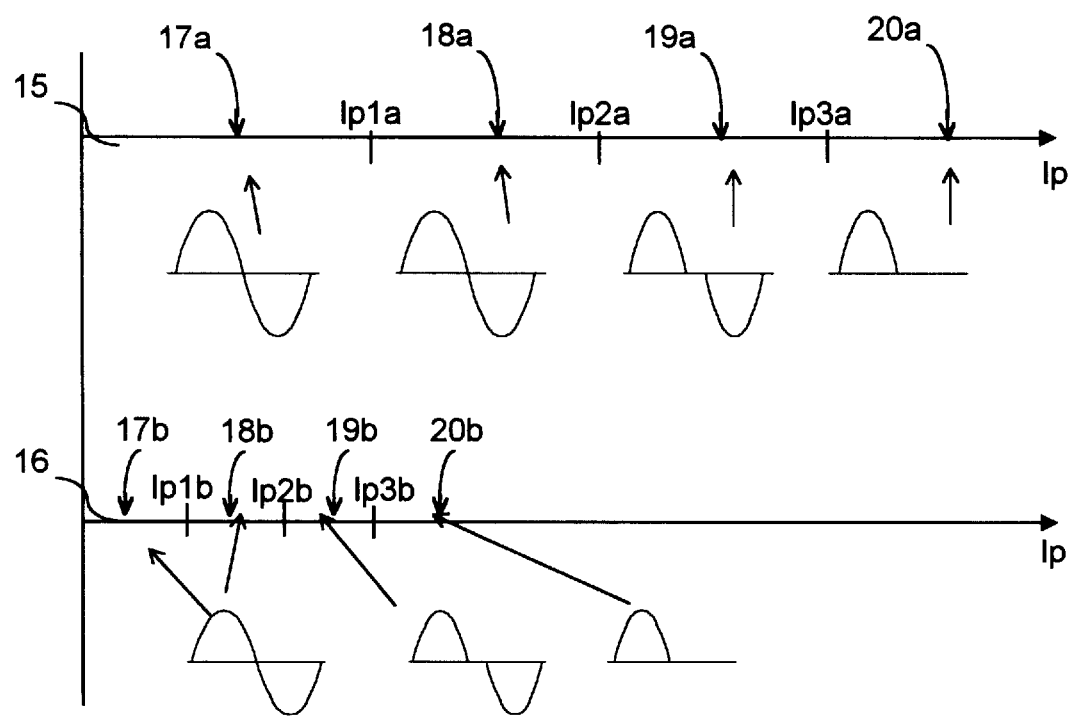
FIG. 3 shows operating areas of circuit breakers of FIG. 2.

In FIG. 3, two curves show the behavior of two circuit breakers of different ratings with respect to primary current ranges. A first curve 15 concerns an upline circuit breaker 10 of high rating and a second curve 16 concerns a downline circuit breaker of lower rating.

For the upline circuit breaker 10, the primary current Ip, the level of which is in a first operating range 17a lower than a first level Ip1a, does not produce any repulse of the contacts 5 of said circuit breaker. In a second range 18a between the first level and a second current level Ip2a, the contacts 5 are repelled but the primary current is not significantly disturbed. Between the second current level Ip2a and a third level Ip3a corresponding to a third range 19a, contact repulses disturb the primary current by interrupting it, in particular before the end of a half-cycle. Above the very high third current level Ip3a, in a fourth operating range 20a, it is necessary to trip immediately, as a short-circuit occurs very close to the output of the upline circuit breaker.

For the downline circuit breaker, the same operating ranges exist respectively 17b, 18b, 19b and 20b but for very low current levels and having the same effects. These levels are respectively first level Ip1b, second level Ip2b, and third level Ip3b.

To achieve selectivity, an instantaneous detection circuit 8, according to an embodiment of the invention, comprises means for recognizing contact repulses produced on the upline circuit breaker 10 or those produced on the contacts of the downline circuit breaker 12 connected in series with the circuit breaker 10. The means for recognizing repulses analyze a signal Is representative of the primary current Ip and detect, in said signal Is, signals or signal forms representative of contact repulses. The signals or signal forms detected are also analyzed to determine what repulses are involved and in what operating ranges.

Figure 4:
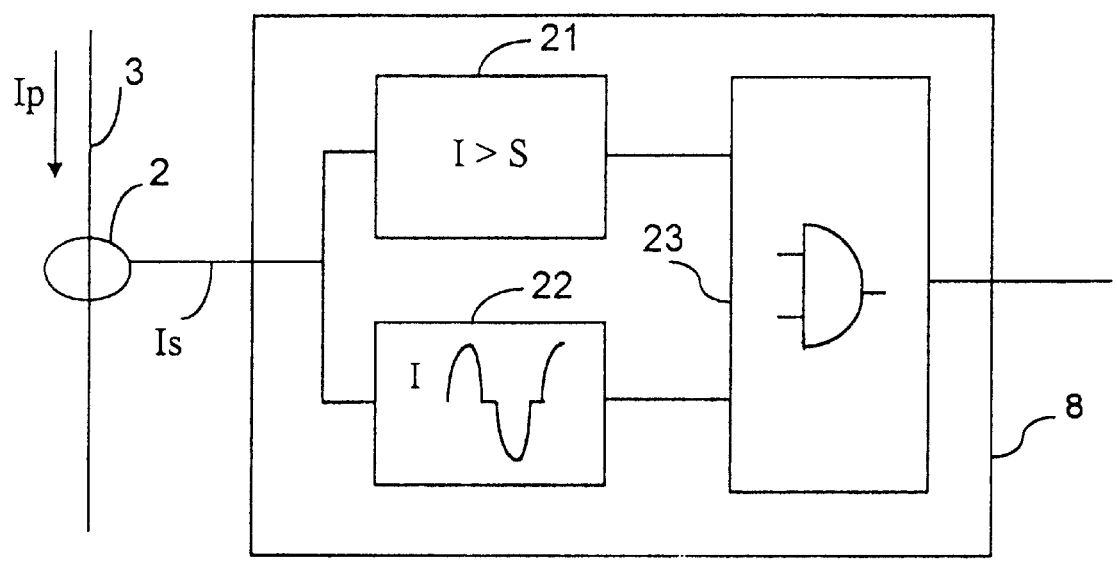
FIG. 4 shows a first block diagram of a selective trip device for a trip unit according to the invention.

In the embodiment of FIG. 4, a selective trip unit 8 according to the invention comprises a circuit 21 for detecting the operating range and a circuit 22 for detecting repulses interrupting the primary current before the end of the half-waves or half-periods of said primary current. The two detection circuits are connected to a sensor 2 and receive a signal Is representative of a primary current Ip. An analysis circuit 23 connected to the two detection circuits disables instantaneous tripping of the upline circuit breaker. To detect the operating ranges, the detection circuit 21 compares the signal Is to a threshold Sp representative of the second current level Ip2$a$.

The repulses manifest themselves in the third operating ranges by current flats between two primary current lobes. These current flats can be detected directly by analysis of the signal Is or by means of the derivative circuits.

Figure 5:
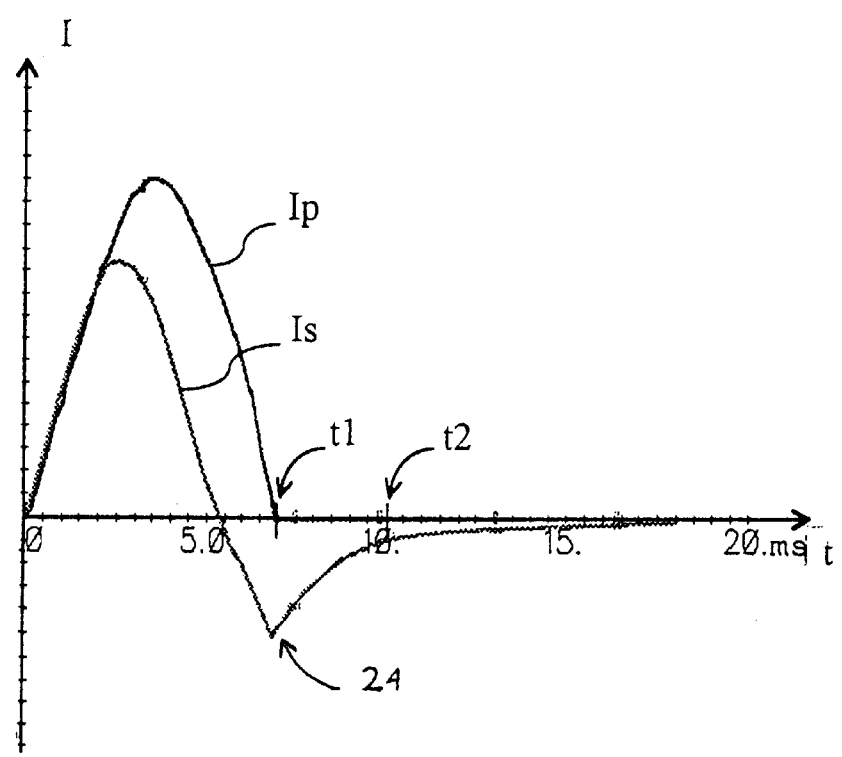
FIG. 5 shows curves illustrating the contact repulse effects on a primary current and on a signal supplied by a current sensor.

The use of magnetic circuit current sensors can facilitate repulse detection, particularly if the magnetic circuit begins to saturate in the operating ranges producing repulses. FIG. 5 shows the form of a signal Is representative of a secondary current of a current sensor through which a primary current Ip is flowing. In this case, the current sensor is preferably a current transformer.

Repulse of the contacts 5 limits the current Ip, then interrupts this current at a time t1 before the end of the half-wave or half-period at a time t2. The primary current being high, the magnetic circuit of the transformer saturates and its operation starts to become derivative. Consequently, the secondary current Is has a phase lead with respect to Ip. Then, at the time t1, the current Ip is interrupted and the secondary current has a reversal of direction which causes a peak. This peak, representative of a repulse, can be used by the detection and analysis circuits. Thus, the combination of the sensor phase lead and the repulse effects enables a peak to be generated, in the signal Is, representative of said repulses.

This peak occurs in a preset time interval during which a repulse can occur.

Figure 6:
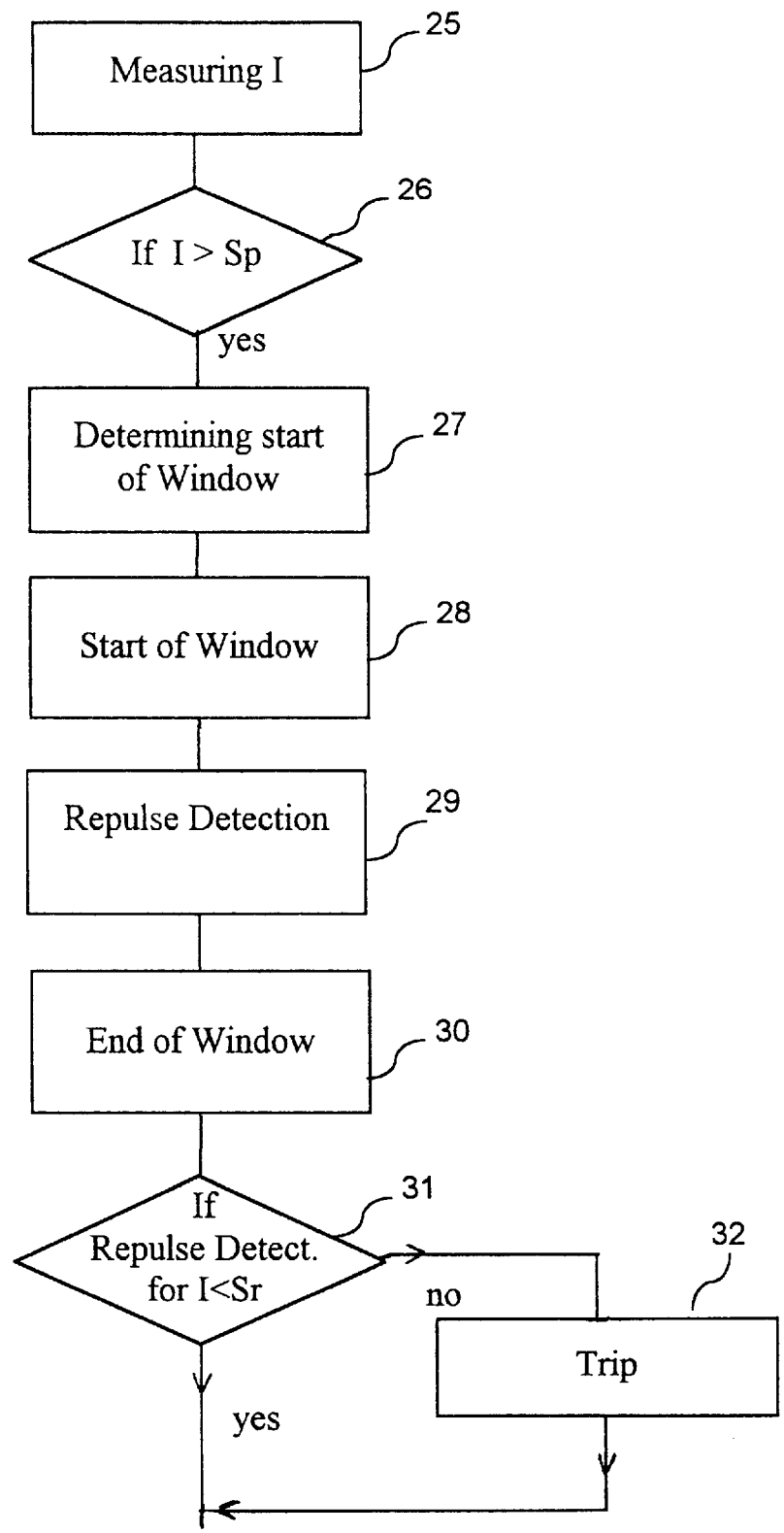
FIG. 6 is a flowchart representative of a first tripping process according to the invention.

In a process to implement the invention, represented in FIG. 6, a first step 25 consists in measuring a signal representative of the current Ip. Then in a second step 26 the signal is compared to a first threshold Sp to determine the operating range. In a step 27, a start time of observation of the repulses is determined. When the sensors are derivative or generate a phase lead, the start time of observation is preferably triggered by the measured signal reaching zero. If the signal is for example rectified, the start can be triggered when said signal becomes close to zero.

With this type of sensor, reaching zero precedes the time of the repulses. Then, between the observation window start and end steps, representative 28 and 30, the repulses can be detected in a step 29.

The duration of the observation window is preferably less than ten milliseconds, for example between 5 and 8 ms.

After the observation period, an analysis step 31 enables tripping to be disabled if repulses were detected for a current lower than a second threshold Sr. In the opposite case, tripping is enabled in a step 32.

Figure 7:
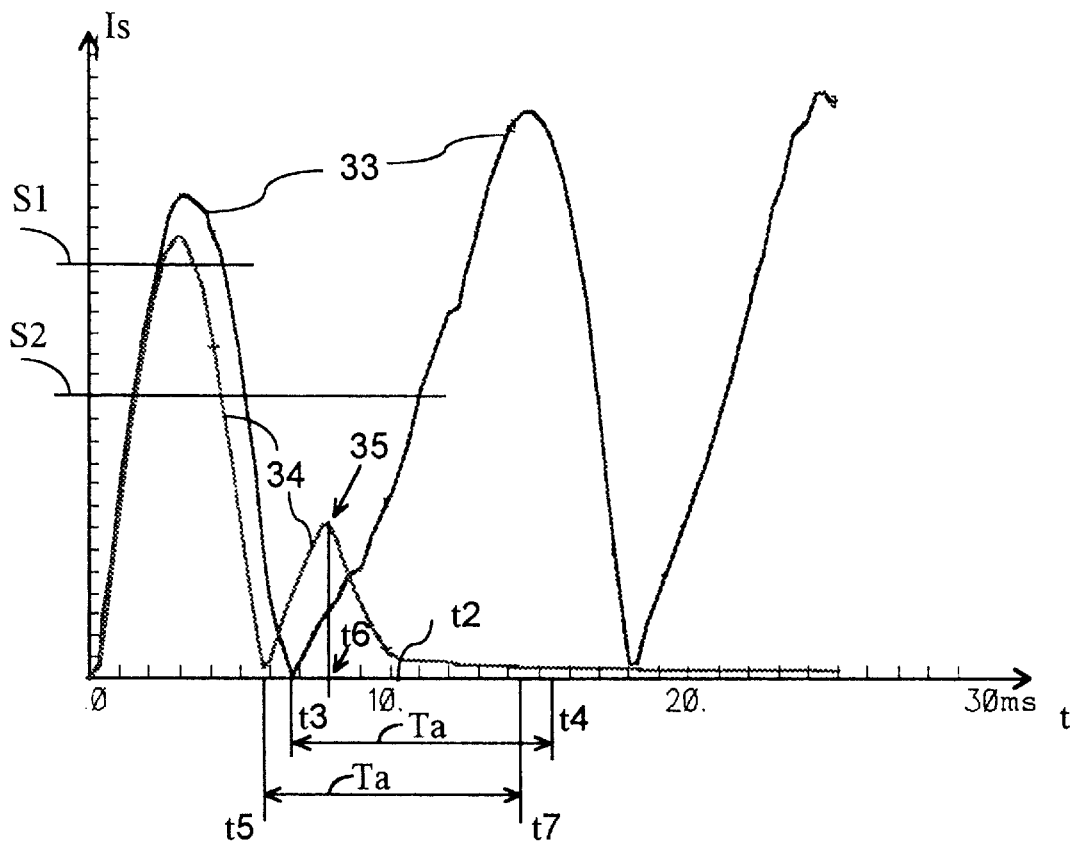
FIGS. 7 and 8 show curves of rectified signals supplied by sensors located in an upline circuit breaker for short-circuit faults downline from said upline circuit breaker or from two circuit breakers in series respectively to a first and a second current level
Figure 8:
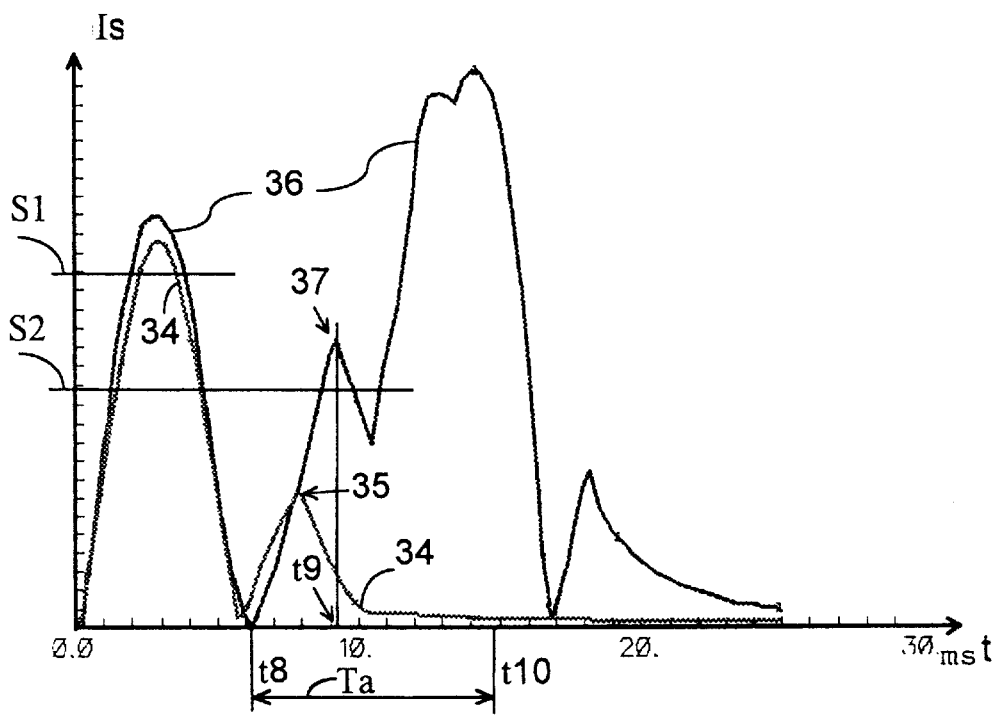

FIGS. 7 and 8 show signals received by instantaneous trip devices in trip units according to an embodiment. The signals are represented in absolute or rectified values, notably for a measuring circuit 6.

A first curve 33 of FIG. 7 shows a signal Is representative of a current Ip when a short-circuit occurs on output of the upline circuit breaker 10, for example on the line 11. If the signal Is (curve 33) exceeds the threshold S1, the trip device 8 waits until the next time said signal Is reaches zero or close to zero, which takes place at a time t3.

Then, during an analysis period Ta, it observes whether signals representative of repulse are present in the signal Is. In this case, it detects the presence of peaks during the period Ta, and at a time t4 it notes the presence or not of peaks. Since this curve 33 does not contain any peaks, no repulses occurred due to a downline circuit breaker, and consequently instantaneous tripping will not be disabled since only the upline circuit breaker is concerned by this short-circuit fault.

A second curve 34 of FIG. 7 shows a signal Is representative of a current Ip when a short-circuit occurs on output of a downline circuit breaker, for example on the line 14. In this case as well, the signal Is exceeds the threshold S1, and consequently the third or fourth operating ranges are detected. Then the signal drops to zero or becomes close to zero at the time t5 and a period Ta corresponding to an observation window is engaged. During this time, a detection circuit 22 detects the presence of peaks. On this curve, a peak 35 occurs at the time t6. Then at the time t7, at the end of the observation period, the peak is analyzed. If the peak is lower than a second threshold S2, this means that the repulse occurred on a downline circuit breaker. Consequently, this downline circuit breaker will trip and open its contacts to clear the short-circuit. In this case, the selective trip device disables tripping of the upline circuit breaker to leave the downline circuit breaker time to open and clear the short-circuit. Selectivity is thus achieved.

On this curve 34, the peak is smaller, as repulse of the downline circuit breaker takes place for currents Ip lower than those of the upline circuit breaker. Likewise, if two circuit breakers are connected in series and both repulse, the limited current will be lower and the peak will be lower than the threshold S2.

FIG. 8 shows a third curve 36 of the signal Is representative of a very high short-circuit current Ip occurring on output of the upline circuit breaker 10, for example on the line 11. As on the other curves, the signal Is exceeds the threshold S1, then at the time t8 it drops to zero. Then, during an analysis window of period Ta, peak detection is performed. In this case, a peak is detected at the time t9. The value of this peak can be stored and then processed at the end of the analysis window period Ta. Since this peak is greater than the second threshold S2, tripping must not be disabled as the upline circuit breaker is operating alone in its third operating range. The peak of high amplitude is representative of contact repulses of the upline circuit breaker.

It is also possible in another embodiment to detect the amplitude of the peaks during the analysis period Ta. In this case, if the peak is greater than the threshold S2, tripping can be caused before the end of the analysis period to speed up opening of the upline circuit breaker.

Figure 9:
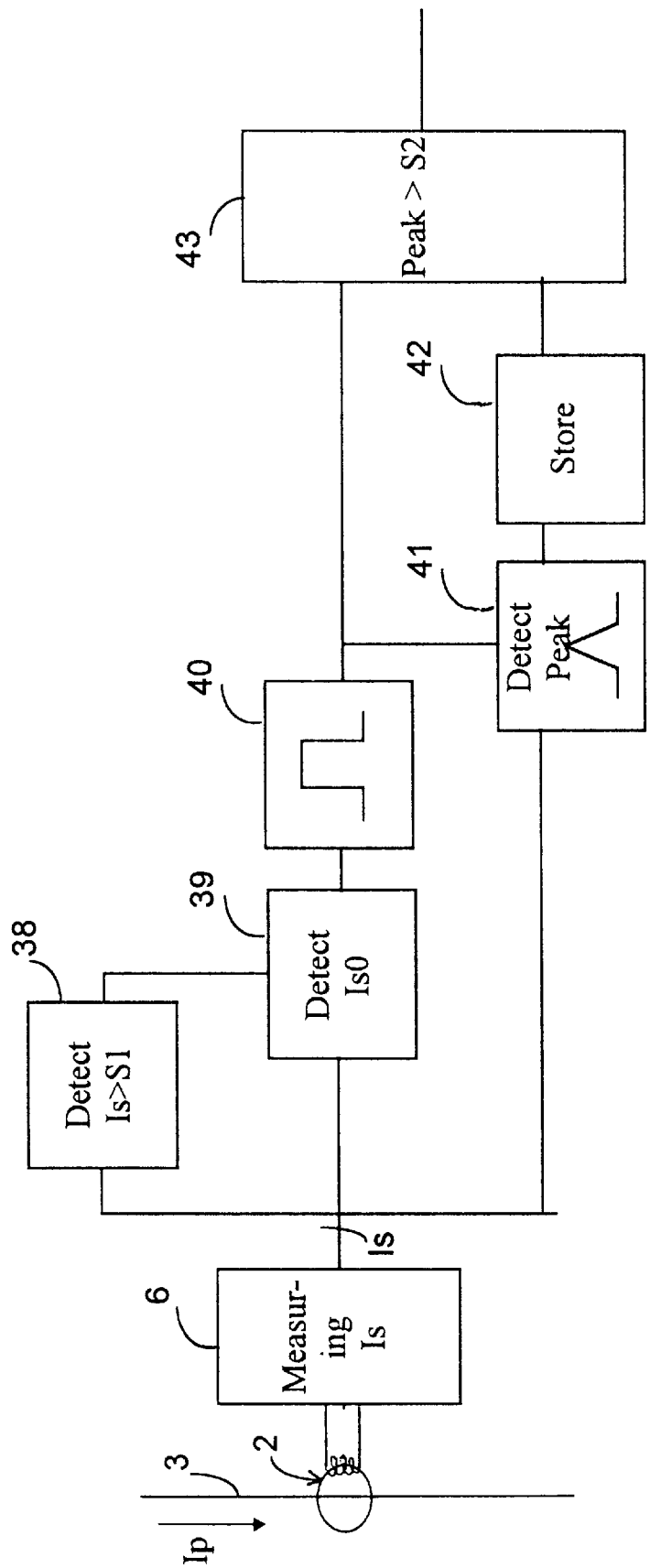
FIG. 9 shows a second block diagram of a selective trip device for a trip unit according to the invention comprising magnetic circuit current sensors.

FIG. 9 represents a selective instantaneous trip device for a trip unit according to the invention. The device is suitable in particular for trip units comprising magnetic circuit current sensors 2 such as current transformers. The measuring circuit 6 receives a current supplied by the sensor and supplies a signal Is representative of the sensor current or of the primary current Ip.

The signal is compared to a first threshold S1 in a first detection circuit 38, then the circuit 38 commands a circuit 39 for detection of the signal reaching zero. When the signal Is supplied to the circuit 39 reaches zero, the circuit commands a time delay circuit 40 which monitors a peak detection circuit 41 during the period Ta. The period Ta is preferably lower than 10 ms. The detection circuit also receives the signal Is and detects the presence of peaks. If a peak is detected, it is stored in a storage circuit 42 connected to the circuit 41. At the end of the analysis period, an analysis circuit connected to the circuits 40 and 42 compares the value of the peak to the threshold S2. If the peak is lower than the threshold S2, instantaneous tripping is disabled. The circuit 43 can also detect whether the peak is greater than the threshold S2 and give a tripping order before the end of the period Ta.

The peak detection circuit detects a consecutive increase and decrease of the signal.

The circuits represented in FIGS. 4 and 9 can be achieved in analog, digital or mixed form. They can also be integrated in the form of functions or processes in microprocessor-based circuits. These functions can be separate or associated to other tripping functions. In these embodiments the signals Is are preferably sampled.

Figure 10:
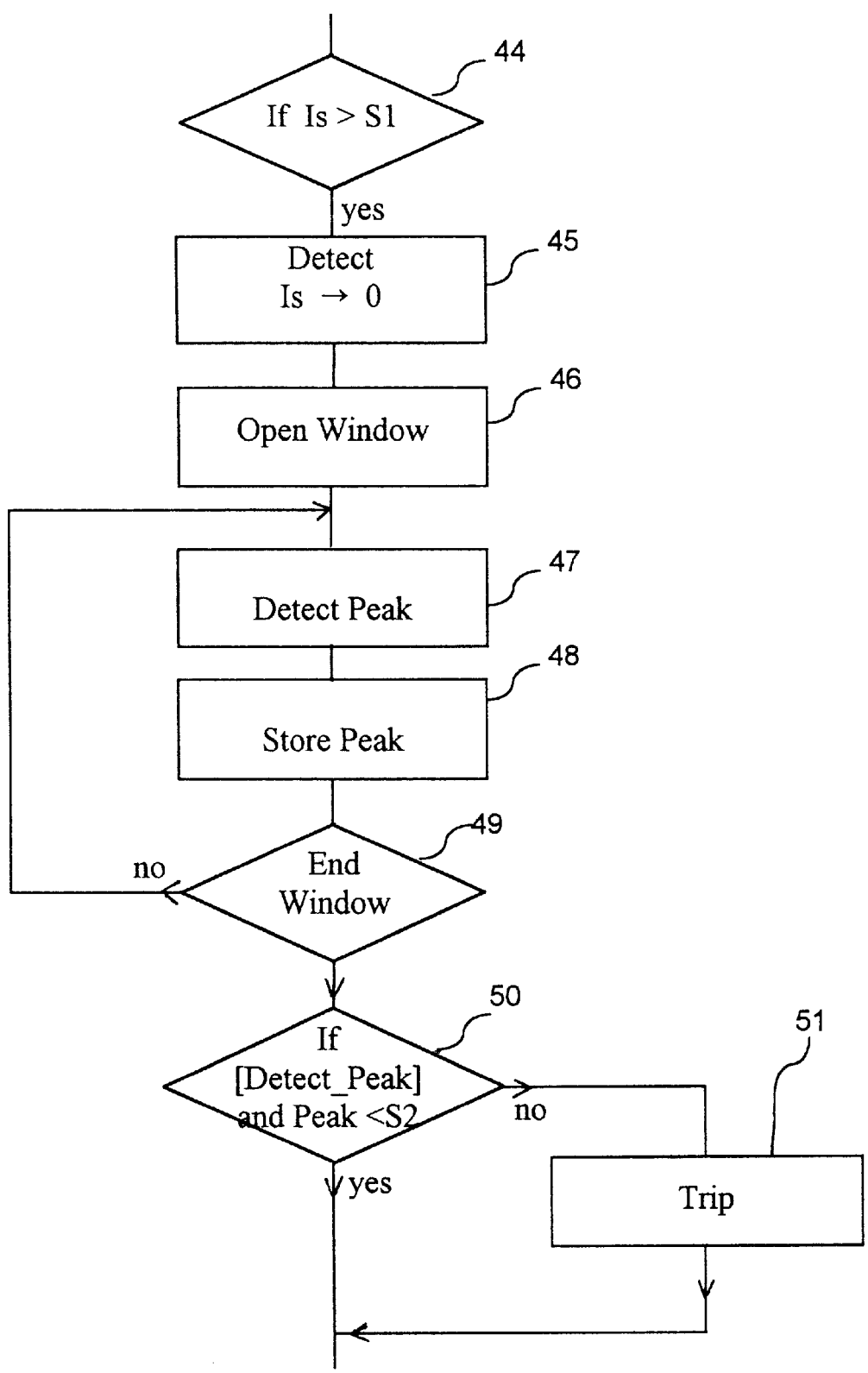
FIGS. 10, 11 and 12 show second, third and fourth flowcharts representative of tripping processes according to the invention.

The flowchart of FIG. 10 shows a selective instantaneous tripping process. The process comprises a first step 44 of comparison of the signal Is to a first threshold S1. Then, if the signal is greater than S1, there is a step 45 of detection of said signal Is reaching zero. Reaching zero also concerns values close to zero, in particular when the signal is rectified.

After detection of reaching zero, a detection phase comprises a step 46 which opens an analysis window. During the analysis window of period Ta, a step 47 detects the presence of peaks and a step 48 stores the value of the peaks detected. A step 49 detects the end of the analysis window and of the detection phase. Then a step 50 disables tripping if the peak detected is lower than the second threshold S2, if not tripping is enabled at a step 51.

Figure 11:
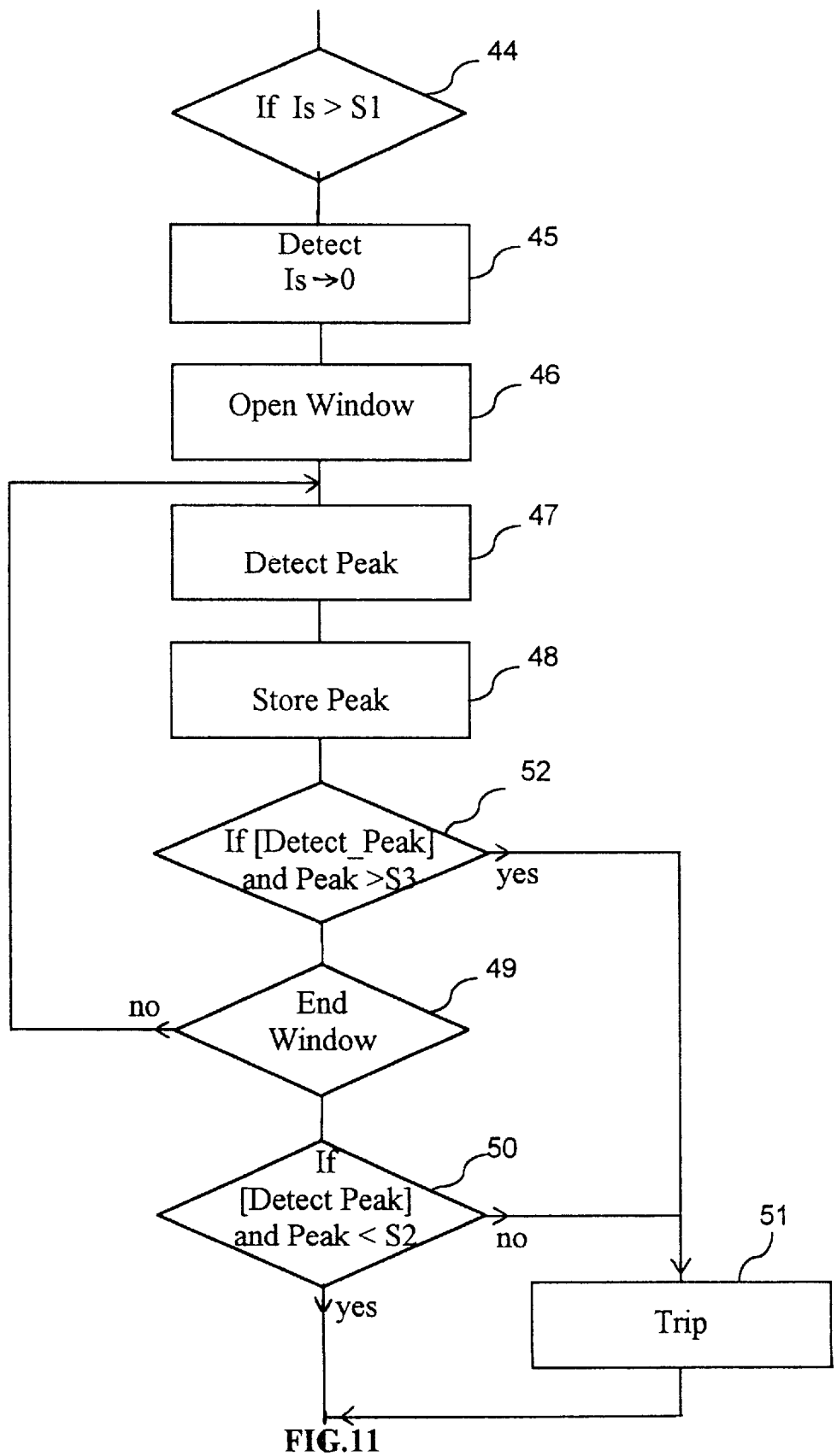
Figure 12:
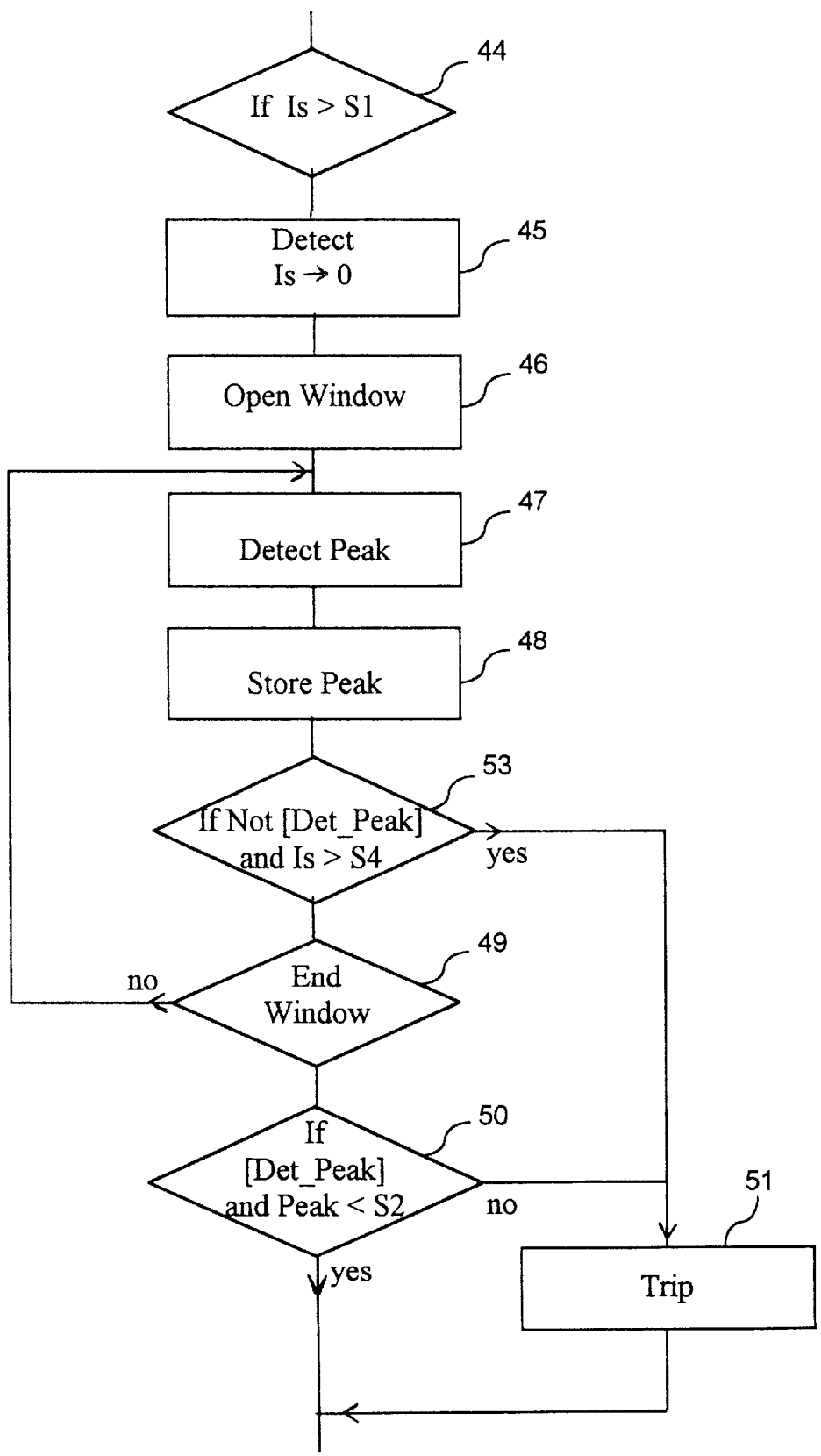

FIGS. 11 and 12 represent alternative embodiments of the flowchart of FIG. 10.

In the flowchart of FIG. 11, an instantaneous tripping process comprises an additional comparison step 52, after the detection or storage steps 48 or 49. This step 52 is used to compare a peak detected to a threshold S3 and to trip at the step 51 if the value of the peak is greater than said threshold S3.

In the flowchart of FIG. 12, an instantaneous tripping process comprises an additional comparison step 53, after the detection or storage steps 48 or 49. This step 53 is used to compare the measured signal to a threshold S4 and to trip at the step 51 if a peak is not detected and if the value of said measured signal becomes greater than the preset threshold S4.

Preferably the thresholds S2, S3 and S4 have the same value, but different values can also be suitable.

The trip units according to the invention comprising selective instantaneous trip devices are preferably integrated in circuit breakers designed to be installed upline from other circuit breakers. The circuit breakers comprising such trip units are not necessarily very bulky limiting circuit breakers.

Although the preferred current sensors are magnetic circuit transformers, trip units according to the invention can comprise other types of sensors such as Hall effect cells, magnetoresistance cells, or Rogowski coils.

In selective instantaneous trip devices, it is possible to detect other signals than peaks to identify the presence of repulses or current flats in the primary current Ip.

What is claimed is:

1. A selective electronic trip unit, comprising
   (a) current sensor means for supplying signals representative of primary alternating currents in at least one conductor;
   (b) a trip unit for opening a contact in the conductor; and
   (c) a processing unit connected between said current sensor means and said trip unit, said processing unit including a selective instantaneous tripping unit for producing a tripping signal to said trip unit in response to signals from said current sensor means, said selective instantaneous tripping unit including
      (1) first detection means connected with said current sensor means for detecting an operating range of current level and supplying an operating range signal when said operating range is detected;
      (2) second detection means connected with said current sensor means for detecting repulses that produce primary current interruptions between two half-waves of the primary alternating current and supplying a repulses signal when at least one repulse is detected, said second detection means operating within said operating range; and
      (3) analysis means connected with said first and second detection means and receiving said operating range signal and said repulses signal for disabling the production of a tripping signal if said repulses and said operating range are detected;
   wherein said selective electronic trip unit differentiates between repulses occurring in a first switch device associated with the selective electronic trip unit and repulses occurring in a second switch device connected in series with said first switch device.

2. A trip unit as defined in claim 1, wherein said analysis means includes means to disable a tripping signal if repulses are detected during a preset analysis period.

3. A trip unit as defined in claim 2, wherein said first detection means comprise first means for comparing the signals supplied by said current sensor means to a first preset threshold and means for determining the start of the preset analysis period.

4. A trip unit as defined in claim 3, wherein said means for determining the start of the preset analysis period comprise means for detecting when signals supplied by said current sensor means approach zero.

5. A trip unit as defined in claim 2, wherein said second detection means comprise means for detecting signal peaks supplied by said current sensor means to detect peaks during the preset analysis period.

6. A trip unit as defined in claim 3, wherein said analysis means comprise second comparison means connected to said means for detecting signal peaks to compare the value of the peaks to a second preset threshold.

7. A trip unit as defined in claim 6, wherein said second comparison means includes means to compare the value of the signal peaks supplied by the current sensor means to the second preset threshold after the preset analysis period.

8. A trip unit as defined in claim 6, wherein said analysis means includes means to disable an instantaneous tripping signal if the detected peaks are lower than the second present threshold.

9. A trip unit as defined in claim 2, wherein the preset analysis period is less than ten milliseconds.

10. A trip unit as defined in claim 1, wherein said second detection means comprise means for detecting signals representative of the derivative of the primary current.

11. A trip unit as defined in claim 1, wherein said current sensor means are magnetic circuit current transformers supplying a secondary current comprising peaks representative of repulses, the signals representative of primary currents corresponding to said secondary current.

12. A trip unit as defined in claim 11, wherein said second detection means comprise means for storing the presence and value of a signal peak supplied by said current sensor means.

13. A process for selectively tripping an electrical conductor, said process comprising:

(a) sensing the primary current in the conductor;

(b) comparing the sensed current with a first preset threshold to determine an operating range of current level for repulse detection;

(c) determining the start of repulse observation;

(d) detecting repulses within the sensed current during a phase of preset duration; and (e) analyzing whether repulses occur for primary currents lower than a second preset threshold to disable instantaneous tripping, thereby determining the location of a switch device where said repulses occur with respect to a protective device supplied by said primary current.

14. A process for selectively tripping an electrical conductor, said process comprising:

(a) sensing the primary alternating current in the conductor;

(b) comparing the sensed current with a first preset threshold to determine an operating range of current level for repulse detection;

(c) detecting when the sensed current drops to zero or close to zero to determine a start time of repulse observation;

(d) detecting peaks representative of repulses in the sensed current during a phase of preset duration; and (e) analyzing if the detected peaks are lower than a second preset threshold to disable instantaneous tripping, thereby determining the location of a switch device where said repulses occur with respect to a protective device supplied by said primary current.

15. A process as defined in claim 14, wherein said peak detecting steps include comparing detected peaks to provide a tripping signal before the end of the detection duration if a detected peak is greater than a third preset threshold.

16. A process as defined in claim 14, wherein said peak detecting step includes comparing the sensed current with a third preset threshold to provide a tripping signal before the end of the detection duration if a peak is not detected and if the sensed current is greater than a fourth preset threshold.

* * * * *